Aug. 12, 1941.      A. V. CARD      2,251,980
SPRING MOUNTING
Filed May 31, 1938
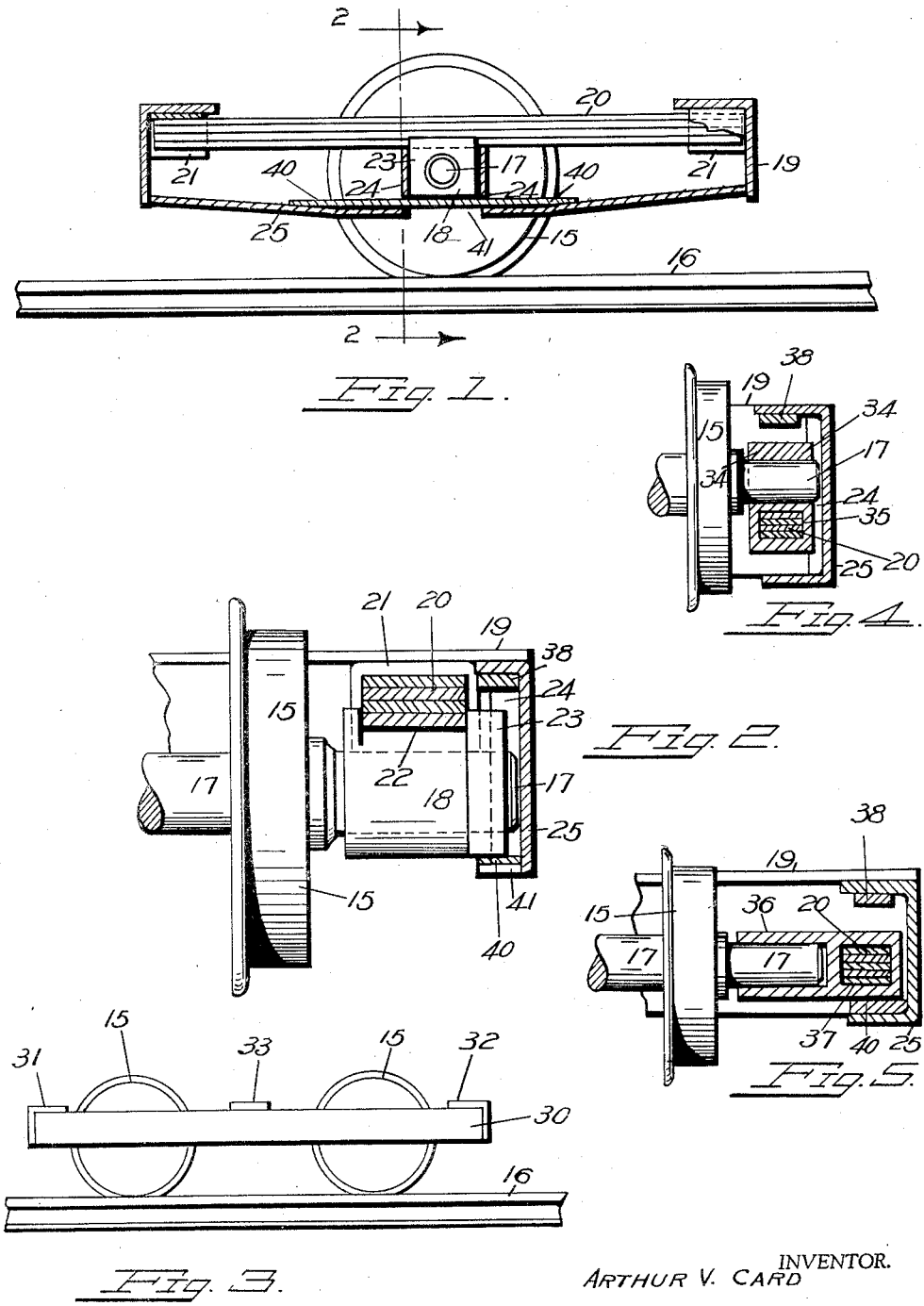
INVENTOR.
ARTHUR V. CARD
BY Rollandet, McGrew & Campbell
ATTORNEYS Patented Aug. 12, 1941

2,251,980

UNITED STATES PATENT OFFICE 2,251,980

SPRING MOUNTING

Arthur V. Card, Denver, Colo., assignor to The C. S. Card Iron Works Company, Denver, Colo., a corporation of Colorado Application May 31, 1938, Serial No. 210,836

3 Claims. (Cl. 105—224)

This invention relates to an improved outboard spring mounting for a wheeled vehicle. In the construction of cars or trucks that are intended for hauling unusually heavy loads, and particularly where operating conditions require a low center of gravity or as low a mounting as possible because of special conditions, conventional spring mounting may not always be satisfactory.

Some of the special conditions that may require an extremely low mounting for the frame of a running gear for a car or the like are when such a car is intended for use as a mine dump car and where it is desirable to have clearance for the tipping movement of the dump body, or where a car may be intended for use in a mine tunnel where overhead clearance is limited. Furthermore, where material is to be loaded into any kind of a car it is advantageous to have a low lift for loading, whether the material be ore in a mine or a heavy load of steel to be transported on a trailer-truck.

In most mining operations and the like, ore cars are designed for use on narrow gauge railway tracks and it has been found highly advantageous to not only mount the bodies of such cars as low as possible but furthermore outboard spring mountings give added stability to the car which, in effect, provides for a wider wheel base than the actual width of the narrow track. Particularly, the trend in mine cars for use in coal mining operations is to build the cars as close to the ground as is possible.

Therefore, it is an object of the present invention to provide a spring mounting for a wheeled vehicle of the above type that provides for an exceptionally low-hung body having maximum capacity.

Another object is the provision of such a mounting that is positioned outboard of the wheels to provide a factor of greater lateral stability for the car.

A still further object is the provision of a spring element in such a mounting that is normally flat and is therefore reversible after use and highly economical to manufacture.

Other objects and advantages reside in details of design and construction which will be more fully disclosed in the following description and in the drawing wherein like parts have been similarly designated and in which:

Figure 1 is a side elevation partially in section of a mine car truck that is made according to a preferred form of the invention and which is well adapted to carry an ore dump body or the like;

Figure 2 is a sectional view along line 2—2 of Figure 1 and drawn to an enlarged scale;

Figure 3 illustrates modified application of the invention;

Figure 4 is a sectional view illustrating a modified form of the invention; and

Figure 5 is a sectional view of a spring suspension made according to a further modification of the present invention.

In the drawing reference character 15 denotes a conventional flanged railway car wheel that is adapted to travel on a rail 16. The wheel is provided with an axle shaft 17 that is housed in an outboard member 18, that may or may not journal the shaft. The truck includes a frame 19 which is supported by a spring element 20 which, in the form shown in Figure 1, spans the frame and is slidably held in its correct position with reference to the frame by clips 21.

The spring element 20 is normally flat as shown and is supported intermediate its load-carrying end portions in a seat 22 on top of the housing 18. At the outer end of the journal box is provided a part 23 that cooperates with vertical guides 24 on a structural component 25 of the frame. By this arrangement the journal box and the car axle shaft are free for limited vertical movement relative to the frame, but are held against horizontal displacement with reference to the frame.

Since the seat 22 for the spring element 20 on the housing 18 holds the spring against axial displacement and the spring is held against longitudinal displacement by the frame, it will be seen that the spring 21 is free to flex as its load varies and furthermore that no holes are required through the spring which always tend to weaken such a spring and may cause premature breakage.

The spring element 20 is composed preferably of a plurality of flat leaves and since it is so constructed it may be reversed from time to time to lengthen its life. The cost of fabricating such a spring is extremely low compared to other shapes and types of springs.

Since the spring element 20 is normally flat the body or superposed load thereabove is supported at a minimum elevation above the road or track over which the car travels, thus providing an extremely low center of gravity, ample clearance for the movement of a dump body, and maximum depth, capacity and convenience in loading the car body.

A further advantage in stability is gained by having the springs mounted outboard of the wheels which in effect gives the car body a wider wheel base and cooperates with the low center of gravity to greatly improve the desirability of any car or truck built according to this invention for the purposes set forth.

In Figure 3 a modified application of the invention is illustrated wherein a single truck frame 30 is supported by two pairs of wheels and two axle shafts. When such a truck is used with the invention, the spring element may support the truck at cross members 31 and 32 or in addition to these points of support cross member 33 may also be supported by the spring. Or the spring may span the truck frame from any two of the above mentioned points of support, or support it at the center member 33 only, while bearing on both housings 18.

In Figure 4 a modified suspension is shown wherein a journal box or housing 34 is provided with an underslung aperture at 35 so that the spring element 20 is mounted below the axle shaft 17 to provide for a still lower mounting of the car body.

In Figure 5 a journal box or housing 36 is illustrated having an aperture 37 beyond the outer extremity of the axle shaft 17 providing a mounting for the spring element 20 that is further outboard of the wheels. The forms of the improved mounting as shown in Figures 4 and 5 are especially well adapted for use in cars for the coal mining industry, or any other haulage operation.

In Figures 2, 4 and 5 a bumper element 38 has been illustrated, the function of which is to bear upon the top of the journal box after the spring element has flexed to a predetermined degree, thus protecting the spring against overload and possible breakage. The bumper element 38 may be optionally used with any form of the invention and it may be modified in its size. The guide elements 24 may also be used with any form of the invention as desired. The bumper 38 also adds to the stability of the car body and eliminates excess side sway.

In a preferred form of construction, a removable keeper member 40 bridges a notch 41 in the lower flange of the side frame channel 25 and keeps the spring, journal and axle assembly from falling downwardly in the event of lifting the truck from the track or of accidental derailment or the like. The notch 41, when provided in the frame, facilitates disassembly of the shaft for repairs, by removing the member 40.

In another form of construction, the shaft 17 may be merely housed in the members 18 and anti-friction type bearings can be provided in the hubs of the wheels 15. In this form, the axle shaft is normally non-rotary but is free to move longitudinally, and the frame members 25 then take the end thrust of the shaft to spare this shock and strain on the wheel bearings. The shaft may be so housed in members 18 that it can also rotate if sufficient torque is applied to it under any special conditions. Therefore, member 18 may be a housing or a journal box or both. In the claims the term "housing" or "journal box" is used to cover all or any function of member 18.

A new result is thus effected in the operation of any railway car, motor truck, truck-trailer or the like that is carried on the improved spring mounting herein disclosed.

While this specification discloses preferred means for reducing the present invention to practice and a preferred embodiment of the invention, changes may occur to those skilled in the art and may be made within the scope of the appended claims, without departing from the spirit of the invention.

What I claim and desire to secure by Letters Patent is:

1. In a wheeled truck for a railway car or the like, a frame, an axially movable axle-shaft having wheels intermediate its ends, journal boxes for the axle-shaft positioned outboard of the respective wheels and between the upper and lower levels of said frame, said boxes being axially open whereby the axle-shaft can project therethrough, and flat spring members supported by the journal boxes between the upper and lower levels of the frame and carrying the frame, parts of the frame being in spaced axial alinement with the axle-shaft ends for direct contact therewith when said axle-shaft moves axially.

2. In a truck for a railway car or the like, the improvement which comprises a frame element having side members of channel shape cross section whose flanges extend inwardly, a wheeled axle shaft positioned between the channel members and having ends terminating adjacent inner surfaces of the webs of such channel members and between the inwardly extending flanges of the respective members, the lower flanges being notched in vertical alinement with the axle shaft, journal boxes for the axle shaft positioned outboard of the wheels between the upper and lower levels of the flanges of said side frame channel members, bumper elements positioned on the channel members above the respective journal boxes, and keepers positioned on the lower flanges of the respective channel members in a position to bridge said notches therein.

3. A truck for a railway car or the like comprising a frame element having side members of channel shape cross section whose flanges extend inwardly, a wheeled axle shaft positioned between the channel members and having ends terminating adjacent inner surfaces of the webs of such channel members and between the inwardly extending flanges of the respective members, the lower flanges being notched in vertical alinement with the axle shaft, journal boxes for the axle shaft positioned outboard of the wheels between the upper and lower levels of the flanges of said side frame channel members, bumper elements positioned on the channel members above the respective journal boxes, keepers positioned on the lower flanges of the respective channel members in a position to bridge said notches therein, means for positioning springs on top of the journal boxes between the upper and lower levels of the flanges of said side frame channel members, and vertically positioned guide members on the insides of the respective channel members adjacent said journal boxes.

ARTHUR V. CARD.